(12) United States Patent
Shen

(10) Patent No.: US 11,290,794 B2
(45) Date of Patent: Mar. 29, 2022

(54) SOUNDING DEVICE

(71) Applicant: AAC Technologies Pte. Ltd., Singapore (SG)

(72) Inventor: Kaihua Shen, Shenzhen (CN)

(73) Assignee: AAC Technologies Pte. Ltd., Singapore (SG)

(*) Notice: Subject to any disclaimer, the term of this patent is extended or adjusted under 35 U.S.C. 154(b) by 0 days.

(21) Appl. No.: 16/993,261

(22) Filed: Aug. 14, 2020

(65) Prior Publication Data

US 2020/0413171 A1 Dec. 31, 2020

Related U.S. Application Data

(63) Continuation of application No. PCT/CN2019/094056, filed on Jun. 30, 2019.

(51) Int. Cl.
*H04R 7/20* (2006.01)
*H04R 1/02* (2006.01)
*H04M 1/02* (2006.01)

(52) U.S. Cl.
CPC .............. *H04R 1/02* (2013.01); *H04M 1/026* (2013.01)

(58) Field of Classification Search
CPC .............. H04R 9/025; H04R 2209/024; H04R 2400/11
See application file for complete search history.

(56) References Cited

U.S. PATENT DOCUMENTS

| | | | | |
|---|---|---|---|---|
| 7,574,013 B2* | 8/2009 | Funahashi | ............. | H04R 9/022 381/396 |
| 7,881,490 B2* | 2/2011 | Chiba | ............. | H04R 9/022 381/433 |
| 8,620,017 B2* | 12/2013 | Konuma | ............. | H04R 9/045 381/407 |
| 8,638,976 B2* | 1/2014 | Watanabe | ............. | H04R 9/025 381/400 |
| 9,049,521 B2* | 6/2015 | Itano | ............. | H04R 3/00 |
| 9,055,359 B2* | 6/2015 | Kamimura | ............. | H04R 31/00 |
| 9,131,304 B2* | 9/2015 | Sakaguchi | ............. | H04R 9/025 |
| 9,338,535 B2* | 5/2016 | Shao | ............. | H04R 9/025 |
| 10,104,476 B2* | 10/2018 | Ge | ............. | H04R 1/288 |
| 10,165,370 B2* | 12/2018 | Zhang | ............. | H04R 9/025 |
| 10,277,986 B2* | 4/2019 | Li | ............. | H04R 9/043 |

(Continued)

FOREIGN PATENT DOCUMENTS

| KR | 101353442 B1 * | 1/2014 | | |
|---|---|---|---|---|
| WO | WO-2010013330 A1 * | 2/2010 | ............. | H04R 9/022 |

*Primary Examiner* — Ryan Robinson
(74) *Attorney, Agent, or Firm* — W&G Law Group

(57) ABSTRACT

The present application discloses a sounding device including a base, and a vibration system and a magnetic circuit system fixed on the base. The vibration system includes a first diaphragm held on the base, and a voice coil of driving the first diaphragm to make a sound through vibration. The magnetic circuit system has a yoke and a magnetic body part fixed on the yoke. The yoke includes a main body arranged opposite to and apart from the base, and a turnup part fixed to the base. The magnetic circuit system further includes a breathable isolator attached to the turnup part and covering the through hole. Compared with the related art, the sounding device disclosed by the present application can prevent magnets from being separated from the yoke in a dropping experiment.

4 Claims, 4 Drawing Sheets

(56) References Cited

U.S. PATENT DOCUMENTS

| | | | |
|---|---|---|---|
| 10,321,224 B2* | 6/2019 | Li | H04R 9/06 |
| 10,362,404 B2* | 7/2019 | Junicho | H04R 9/06 |
| 10,631,080 B2* | 4/2020 | Lee | H04R 1/2826 |
| 10,820,106 B2* | 10/2020 | Gu | H04R 9/025 |
| 2021/0037313 A1* | 2/2021 | Cho | H04R 1/2876 |

* cited by examiner

SOUNDING DEVICE

FIELD OF THE PRESENT DISCLOSURE

The present application relates to technical field of an electronic equipment, in particular to a sounding device.

DESCRIPTION OF RELATED ART

With the emergence of the mobile Internet Era, smart mobile devices are increasing. However, undoubtedly, mobile phones are the most common and portable mobile terminal devices in numerous mobile devices. At present, the mobile phones have various functions, one of which is a high-quality music function, while loudspeakers in the mobile phones are indispensable to achievement of the high-quality music function.

For optimal performance, a sounding device in the related art adopts a large-leakage cuff-less design, namely no cuff on a short shaft of the sounding device and no support for a yoke, so that the yoke easily deforms to separate magnets in a dropping experiment, resulting in a failure of the sounding device.

Thus, it is necessary to provide a novel sounding device to solve the problem.

SUMMARY OF THE INVENTION

One of the present invention is to provide a sound device which can prevent magnets from being separated from the yoke in a dropping experiment.

In order to achieve the object mentioned above, the present application discloses a sounding device including a base, and a vibration system and a magnetic circuit system fixed on the base. The vibration system includes a first diaphragm held on the base, and a voice coil of driving the first diaphragm to make a sound through vibration. The magnetic circuit system has a yoke and a magnetic body part fixed on the yoke. The yoke includes a main body arranged opposite to and apart from the base, and a turnup part fixed to the base. The magnetic circuit system further includes a breathable isolator attached to the turnup part and covering the through hole. Compared with the related art, the sounding device disclosed by the present application can prevent magnets from being separated from the yoke in a dropping experiment.

Further, the turnup part and the main body are integrally formed.

Further, the plurality of through holes are formed in shape of at least one of square holes, round holes, triangular holes and trapezoidal holes.

Further, the magnetic body part comprises a main magnet and a secondary magnet fixed on the main body; the main magnet is fixedly arranged at the center of the main body; and the secondary magnet is arranged apart from the main magnet and is clamped between the base and the yoke.

Further, the vibration system further comprises an elastic support element fixed between one end of the voice coil far away from the diaphragm, and the second side surfaces; the elastic support element comprises spaced first fixing arm and second fixing arm, and an elastic arm connecting the first fixing arm and the second fixing arm; the first fixing arm is fixed at one end of the voice coil far away from the first diaphragm; and the second fixing arm is fixed on the second side surfaces.

Further, the second fixing arm is fixed to the second side surfaces in an attaching manner; and a tail end of the turnup part is fixed to the second fixing arm in an abutting manner.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Figure 1:
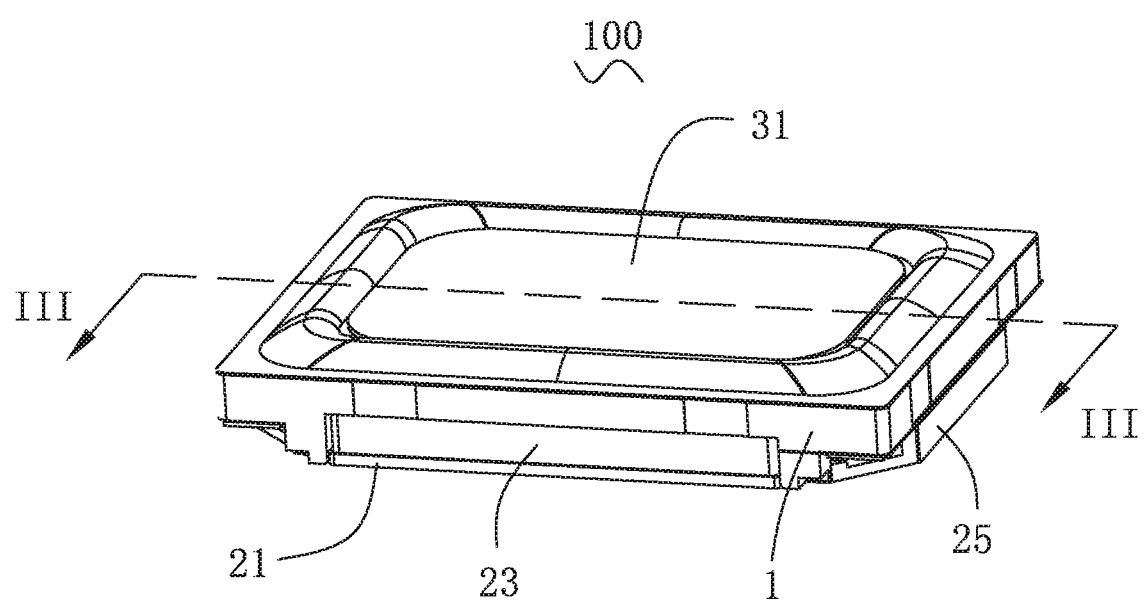
FIG. 1 is an isometric view of a sounding device in accordance with an exemplary embodiment of the present invention.
Figure 2:
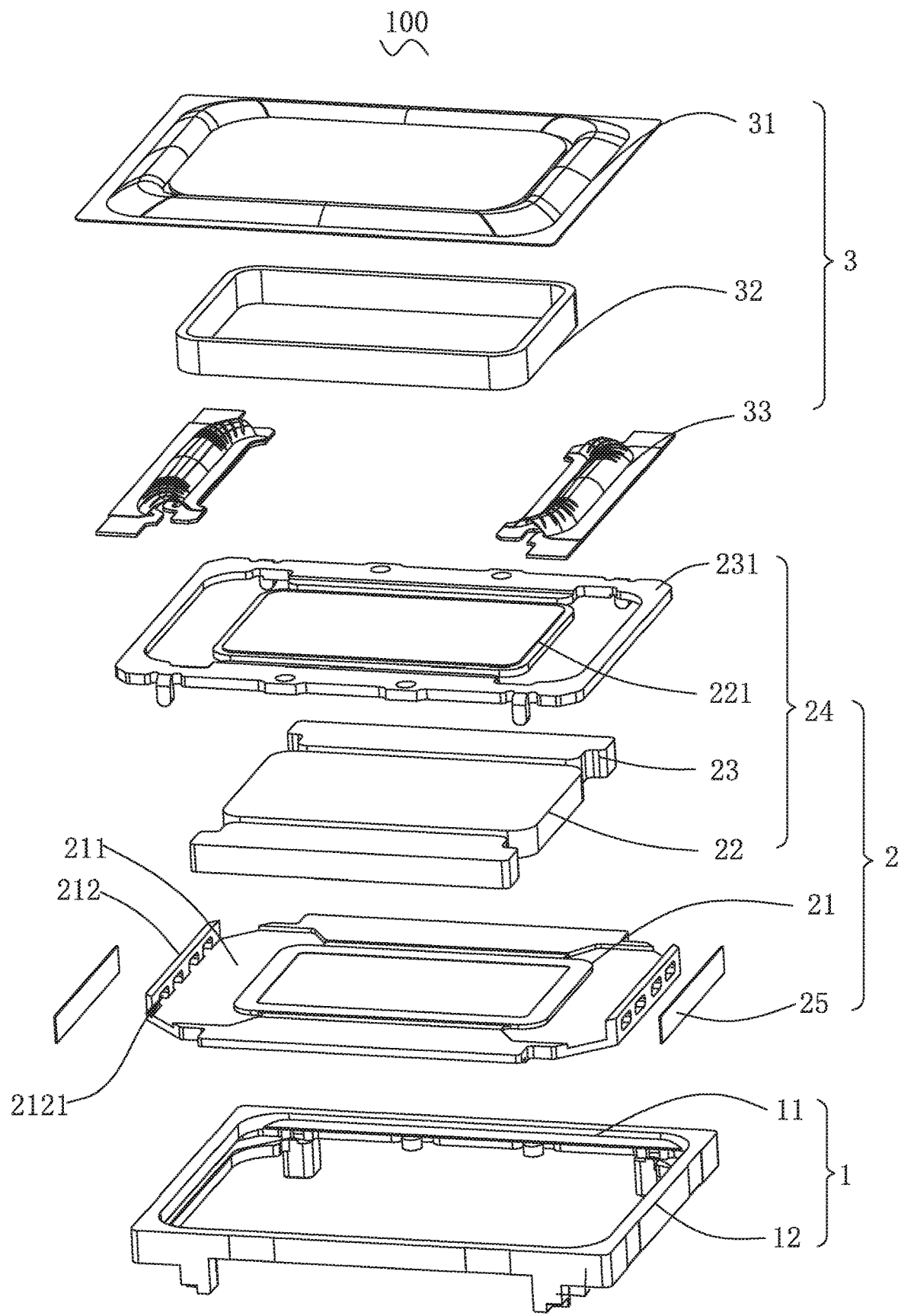
FIG. 2 is an exploded view of the sounding device in FIG. 1.
Figure 3:
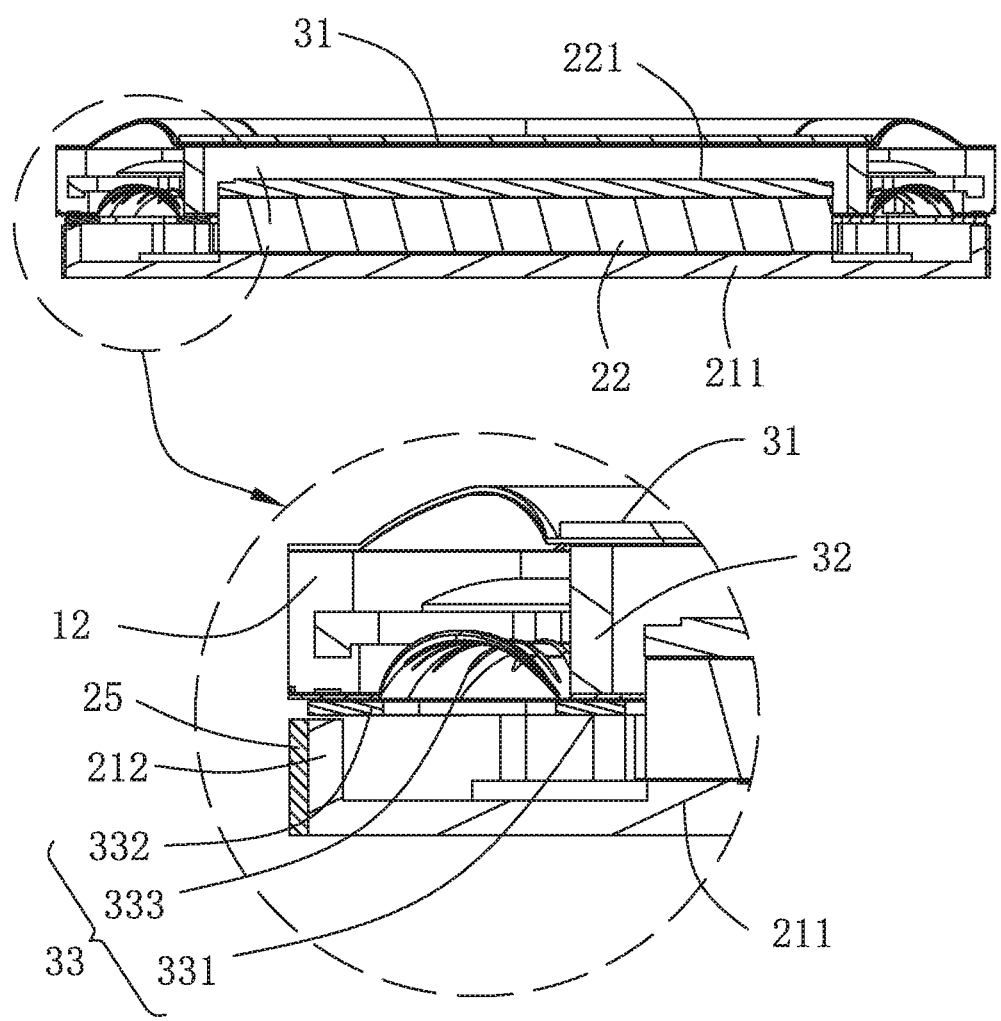
FIG. 3 is a cross-sectional view of the sounding device taken along line III-III in the FIG. 1.
Figure 4:
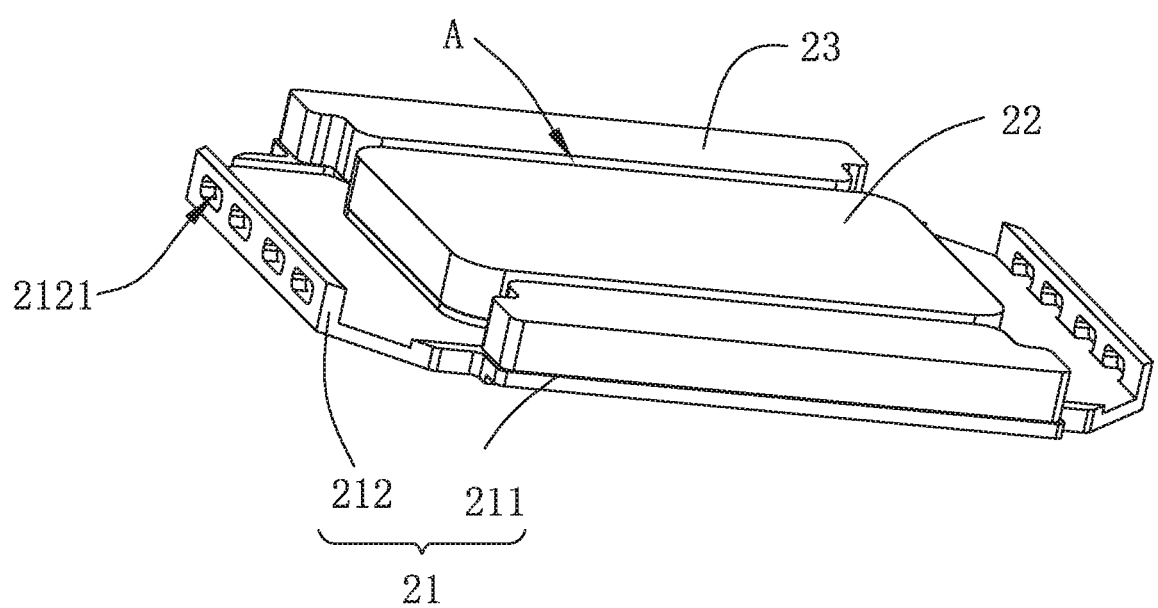
FIG. 4 is an assembly view of a yoke, a main magnet and a secondary magnet of the sounding device.

Referring to FIGS. 1-4, the present application discloses a sounding device 100 including a base 1, and a magnetic circuit system 2 and a vibration system 3 fixedly arranged on the base 1.

The base 1 is in an annular shape and comprises two oppositely arranged first side surfaces 11 and two oppositely arranged second side surfaces 12.

The vibration system 3 comprises a first diaphragm 31, a voice coil 32 and an elastic support element 33. The first diaphragm 31 is hold on the upper part of the base 1. The voice coil 32 is fixed at the lower part of the first diaphragm 31 and generates electromagnetic force together with the magnetic circuit system 2 after being electrified, so as to drive the first diaphragm 31 to make a sound through vibration. The elastic support element 33 is used for fixing and supporting the voice coil 32, conducting electricity to the voice coil 32 and increasing an amplitude of the sounding device 100 to improve the loudness of the made sound of the sounding device 100.

The elastic support element 33 comprises spaced first fixing arm 331 and second fixing arm 332, and an elastic arm 333 connecting the first fixing arm 331 and the second fixing arm 332; the first fixing arm 331 is fixed at one end, far away from the first diaphragm 31, of the voice coil 32; and the second fixing arm 332 is fixed on the second side surfaces 12.

The magnetic circuit system 2 comprises a yoke 21 fixedly connected to the lower part of the base 1, a main magnet 22, a main pole core 221 attached to the surface of the main magnet 22, a secondary magnet 23 arranged at two sides of the main magnet 22, a secondary pole core 231 attached to the surface of the secondary magnet 23 and a breathable isolator 25, wherein the main magnet, the main pole core, the secondary magnet, the secondary pole core and the breathable isolator are fixed on the yoke 21. The secondary magnet 23 and the main magnet 22 are arranged at an interval to form a magnetic gap A. One end of the voice coil 32 is connected with the first diaphragm 31 and the other end is inserted into the magnetic gap A. Both the main pole core 221 and the secondary pole core 231 are made of a magnetic conduction material and are used for playing a magnetic conduction role, gathering a magnetic field and improving the magnetic induction performance of a product. Moreover, the secondary magnet 23 is clamped between the base 1 and the yoke 21. The main magnet 22, the secondary magnet 23, the main pole core 221 and the secondary pole core 231 form a magnet body part 24 in common.

The yoke 21 comprises a main body 211 arranged opposite to and apart from the base 1, and a turnup part 212 formed by extending towards the second side surfaces 12 from the edge of the main body 211.

The turnup part 212 is fixed to the base 1. Specifically, the turnup part 212 extends from the edge, parallel to the second side surfaces 12, of the main body 211 to the second side surfaces 12 to be fixed to the second fixing arm 332 in an abutting manner. The elastic support element 33 is positioned between the main body 211 and the second side surfaces 12, and the second fixing arm 332 is fixed at one side, close to the main body 211, of each second side surface 12 in an attaching manner. The turnup part 212 is clamped between the second fixing arm 332 and the main body 211.

The turnup part 212 and the main body 211 are integrally formed. The turnup part 212 is in a plate shape, the turnup part 212 is provided with through holes 2121 penetrating therethrough, and the through holes 2121 communicate with the magnetic gap A. The breathable isolator 5 is fixed to the turnup part 212 in an attaching manner and covers the through holes 2121. Preferably, a plurality of through holes 2121 are arranged; and the through holes 2121 are at least one of square holes, round holes, triangular holes and trapezoidal holes.

The turnup part 212 can support the yoke 21 on the base 1 to improve the strength of the yoke 21, thereby avoiding a failure of the sounding device 100 due to the fact that the yoke easily deforms in a dropping experiment and the main magnet 22 and the secondary magnet 23 are separated from the yoke 21.

Compared with the related art, through the arrangement of the turnup parts clamped between the second side surface and the main body, the sounding device provided by the present application can not only support the yoke to improve the strength of the yoke and to prevent the magnet from being separated from the yoke in a dropping experiment, but also adjust the leakage of the sounding device through adjusting the sizes and number of the turnup parts, so as to ensure unchanged performance of the sounding device.

It is to be understood, however, that even though numerous characteristics and advantages of the present exemplary embodiment have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A sounding device, comprising:
   a base, having two oppositely arranged first side surfaces and two oppositely arranged second side surfaces connected with the two first side surfaces; the first side surfaces and the second side surfaces being enclosed for forming an annular shape;
   a vibration system having a first diaphragm mounted on the base, and a voice coil for driving the first diaphragm to make a sound through vibration;
   a magnetic circuit system fixed on the base, the magnetic circuit system including a yoke having a main body arranged opposite to and apart from the base and a turnup part formed by extending towards the second side surfaces from the edge of the main body, and a magnetic body part fixed on the yoke with a magnetic gap for partially receiving the voice coil; wherein
   the turnup part is fixed to the base and includes a plurality of through holes formed in the turnup part and communicating with the magnetic gap; and the magnetic circuit system further comprises a breathable isolator attached to the turnup part and covering the through hole;
   the magnetic body part comprises a main magnet and a secondary magnet fixed on the main body; the main magnet is fixedly arranged at the center of the main body; and the secondary magnet is arranged apart from the main magnet and is clamped between the base and the yoke;
   the vibration system further comprises an elastic support element fixed between one end of the voice coil far away from the diaphragm, and the second side surfaces; the elastic support element comprises spaced first fixing arm and second fixing arm, and an elastic arm connecting the first fixing arm and the second fixing arm; the first fixing arm is fixed at one end of the voice coil far away from the first diaphragm; and the second fixing arm is fixed on the second side surfaces.

2. The sounding device as described in claim 1, wherein the turnup part and the main body are integrally formed.

3. The sounding device as described in claim 1, wherein the plurality of through holes are formed in shape of at least one of square holes, round holes, triangular holes and trapezoidal holes.

4. The sounding device as described in claim 1, wherein the second fixing arm is fixed to the second side surfaces in an attaching manner; and a tail end of the turnup part is fixed to the second fixing arm in an abutting manner.

* * * * *